United States Patent
Kobayashi

(10) Patent No.: US 11,381,798 B2
(45) Date of Patent: Jul. 5, 2022

(54) IMAGE PROCESSING APPARATUS, CONTROL METHOD THEREFOR, AND NON-TRANSITORY COMPUTER-READABLE STORAGE MEDIUM

(71) Applicant: CANON KABUSHIKI KAISHA, Tokyo (JP)

(72) Inventor: Toru Kobayashi, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/141,619

(22) Filed: Jan. 5, 2021

(65) Prior Publication Data

US 2021/0218945 A1    Jul. 15, 2021

(30) Foreign Application Priority Data

Jan. 10, 2020    (JP) .............................. JP2020-003067

(51) Int. Cl.
*H04N 9/87*    (2006.01)
*G11B 27/10*   (2006.01)
*G06V 20/40*   (2022.01)

(52) U.S. Cl.
CPC ............... *H04N 9/87* (2013.01); *G06V 20/46* (2022.01); *G11B 27/10* (2013.01)

(58) Field of Classification Search
CPC .......... H04N 9/87; H04N 5/85; H04N 9/8042; G11B 27/10; G11B 27/105; G11B 27/329; G11B 27/034; G06K 9/00744; G06K 9/00; G06T 7/00

USPC ......................................................... 386/241
See application file for complete search history.

(56) References Cited

U.S. PATENT DOCUMENTS

2012/0243847 A1* 9/2012 Toyoda ................ G11B 19/022
                                                386/230
2014/0355946 A1* 12/2014 Nakao ................ H04N 5/23293
                                                386/200

FOREIGN PATENT DOCUMENTS

JP          2012-129719 A     7/2012

* cited by examiner

*Primary Examiner* — Thai Q Tran
*Assistant Examiner* — Nienru Yang
(74) *Attorney, Agent, or Firm* — Cowan, Liebowitz & Latman, P.C.

(57) ABSTRACT

An image processing apparatus comprises a processing unit which executes determination processing for determining a parameter to be used in development processing of a target playback frame within a RAW movie file, based on a difference between a parameter for the target playback frame and a parameter used in development processing of a proceeding frame, a developing unit which performs development processing on a RAW image of the target playback frame using the determined parameter, and a control unit which, when a playback start position is designated by a user, determines a parameter for a frame of interest corresponding to the playback start position, by causing the processing unit to execute the determination processing for each of a plurality of frames from a frame that is a preset number of frames before the frame of interest to the frame of interest.

10 Claims, 9 Drawing Sheets

| n | 0 | 1 | 2 | 3 | 4 | 5 | 6 | 7 | 8 |
|---|---|---|---|---|---|---|---|---|---|
| Pn | 0 | 100 | 100 | 100 | 100 | 100 | 100 | 100 | 100 |
| delta | --- | 100 | 50 | 25 | 13 | 7 | 4 | 2 | 1 |
| delta' | --- | 50 | 25 | 12 | 6 | 3 | 2 | 1 | 1 |
| P'n | 0 | 50 | 75 | 87 | 93 | 96 | 98 | 99 | 100 |

FIG. 5

| n | 0 | 1 | 2 | 3 | 4 | 5 | 6 | 7 | 8 | 9 | 10 | 11 | 12 |
|---|---|---|---|---|---|---|---|---|---|---|----|----|----|
| Pn | 0 | 100 | 50 | 100 | 50 | 30 | 70 | 60 | 40 | 30 | 100 | 80 | 70 |
| delta | --- | 100 | 0 | 50 | -25 | -32 | 24 | 2 | -19 | -19 | 61 | 11 | -4 |
| delta' | --- | 50 | 0 | 25 | -13 | -16 | 12 | 1 | -10 | -10 | 30 | 5 | -2 |
| P'n | 0 | 50 | 50 | 75 | 62 | 46 | 58 | 59 | 49 | 39 | 69 | 74 | 72 |

FIG. 6

| n | 4 | 5 | 6 | 7 | 8 | 9 | 10 | 11 | 12 |
|---|---|---|---|---|---|---|---|---|---|
| Pn | 50 | 30 | 70 | 60 | 40 | 30 | 100 | 80 | 70 |
| delta | --- | -20 | 30 | 5 | -17 | -18 | 61 | 11 | -4 |
| delta' | --- | -10 | 15 | 2 | -9 | -9 | 30 | 5 | -2 |
| P'n | 50 | 40 | 55 | 57 | 48 | 39 | 69 | 74 | 72 |

FIG. 7

| n | 10 | 11 | 12 |
|---|----|----|----|
| Pn | 100 | 80 | 70 |
| delta | --- | -20 | -20 |
| delta' | --- | -10 | -10 |
| P'n | 100 | 90 | 80 |

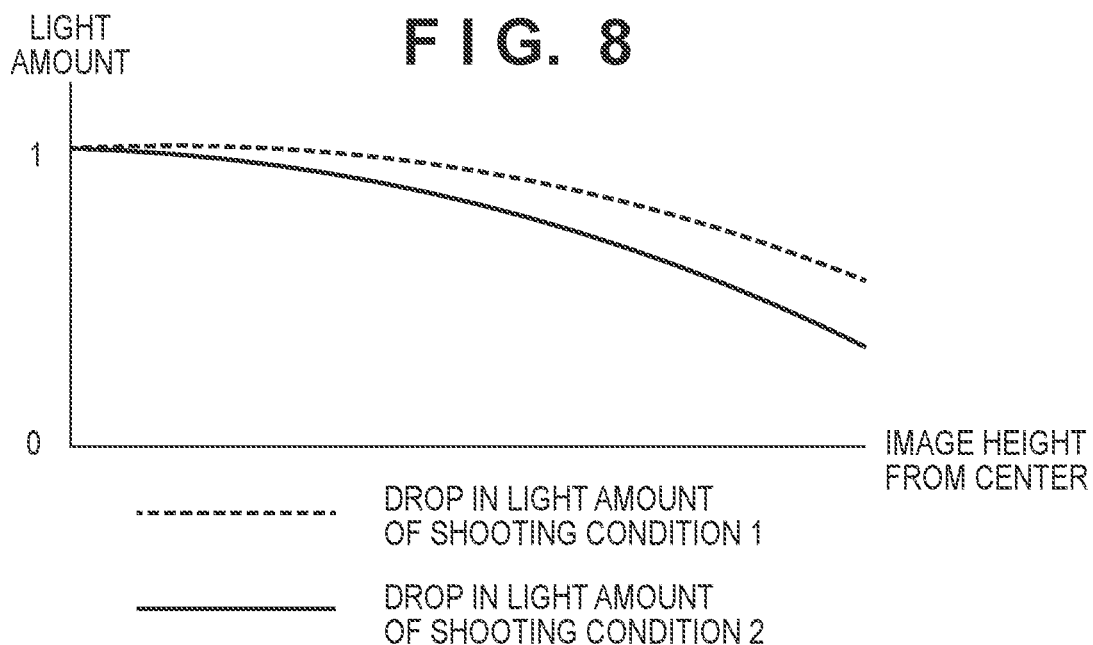
FIG. 8
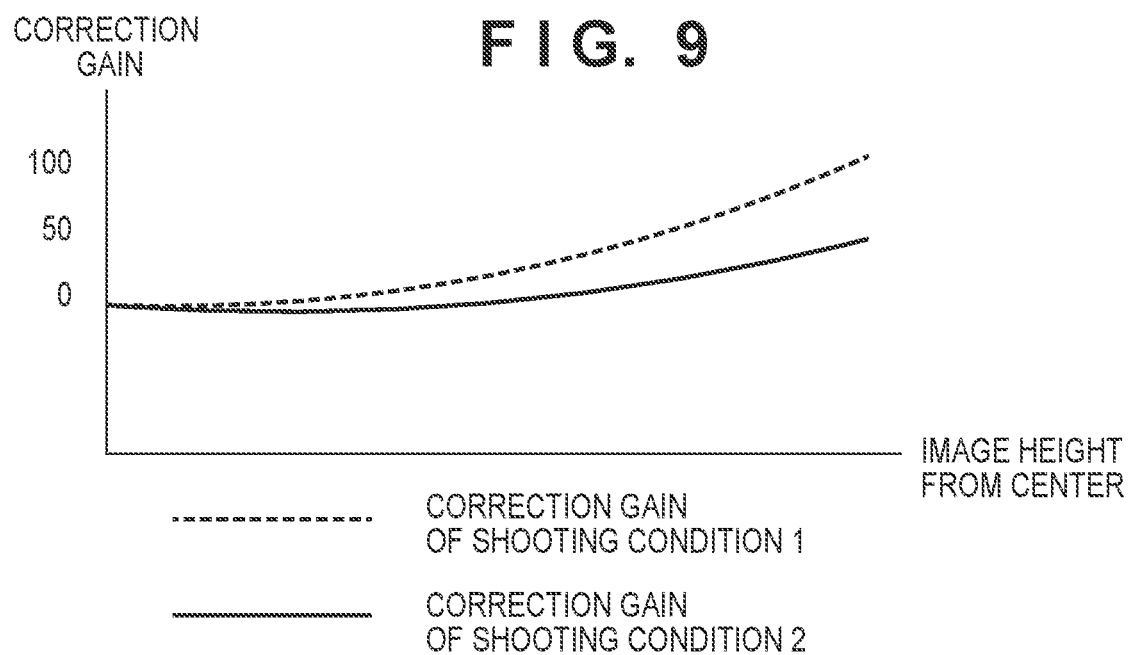
FIG. 9
FIG. 10

FIG. 12

| n | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| Pn | 1000 | 12000 | 12000 | 12000 | 12000 | 12000 | 12000 | 12000 | 12000 | 12000 | 12000 | 12000 | 12000 | 12000 | 12000 | 12000 |
| delta | — | 11000 | 5500 | 2750 | 1375 | 688 | 344 | 172 | 86 | 43 | 22 | 11 | 6 | 3 | 2 | 1 |
| delta' | — | 5500 | 2750 | 1375 | 687 | 344 | 172 | 86 | 43 | 21 | 11 | 5 | 3 | 1 | 1 | 1 |
| P'n | 1000 | 6500 | 9250 | 10625 | 11312 | 11656 | 11828 | 11914 | 11957 | 11978 | 11989 | 11994 | 11997 | 11998 | 11999 | 12000 |

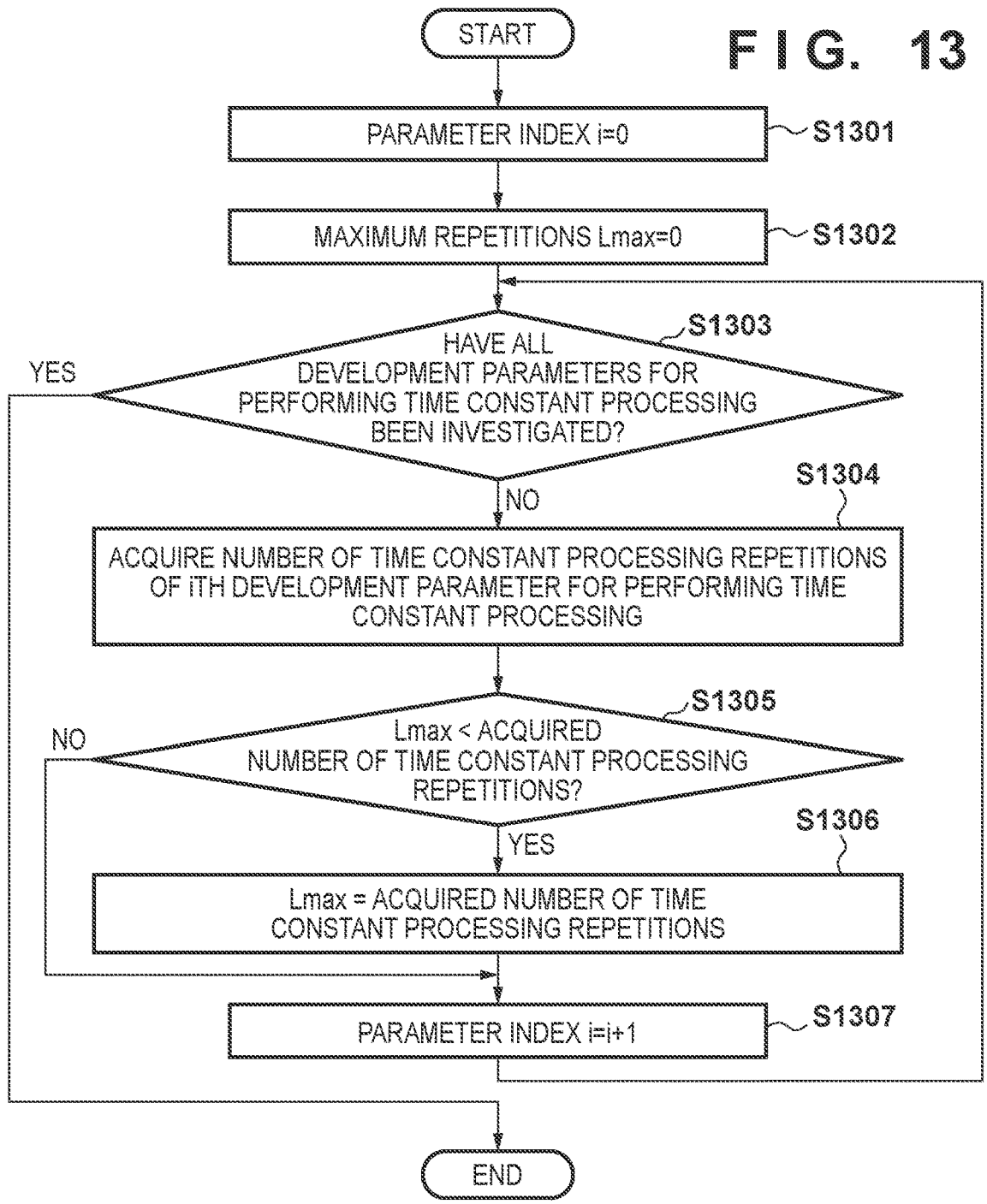

FIG. 15

| n | 0 | 1 | 2 | 3 | 4 | 5 | 6 | 7 | 8 | 9 |
|---|---|---|---|---|---|---|---|---|---|---|
| Pn | 0 | 200 | 200 | 200 | 200 | 200 | 200 | 200 | 200 | 200 |
| delta | — | 200 | 100 | 50 | 25 | 13 | 7 | 4 | 2 | 2 |
| delta' | — | 100 | 50 | 25 | 12 | 6 | 3 | 2 | 1 | 1 |
| P'n | 0 | 100 | 150 | 175 | 187 | 196 | 196 | 197 | 199 | 200 |

FIG. 16

| n | 0 | 1 | 2 | 3 | 4 | 5 | 6 | 7 | 8 | 9 | 10 |
|---|---|---|---|---|---|---|---|---|---|---|----|
| Pn | 0 | 300 | 300 | 300 | 300 | 300 | 300 | 300 | 300 | 300 | 300 |
| delta | — | 300 | 150 | 75 | 38 | 19 | 10 | 5 | 3 | 2 | 1 |
| delta' | — | 150 | 75 | 37 | 19 | 9 | 5 | 2 | 1 | 1 | 1 |
| P'n | 0 | 150 | 225 | 262 | 281 | 290 | 295 | 297 | 298 | 299 | 300 |

FIG. 17

| COEFFICIENT k | LARGEST CHANGE AMOUNT | NUMBER OF TIMES |
|---|---|---|
| 2 | 100 | 8 |
| 2 | 200 | 9 |
| 2 | 300 | 10 |

IMAGE PROCESSING APPARATUS, CONTROL METHOD THEREFOR, AND NON-TRANSITORY COMPUTER-READABLE STORAGE MEDIUM

BACKGROUND OF THE INVENTION

Field of the Invention

The present invention relates to an image processing apparatus, a control method therefor, and a non-transitory computer-readable storage medium.

Description of the Related Art

RAW movie shooting apparatuses that record movies called RAW movies and RAW movie processing apparatuses for playing back and editing shot RAW movies are known. A RAW movie is a movie in which so-called RAW data which is data that is obtained by light being received with a CMOS sensor or the like and that has yet to undergo image processing is recorded as the data of each frame. Unlike compressed movie files such as MPEG, with RAW movies, editing with little degradation and image processing tailored to the output can be applied, by applying image processing to each frame during playback or editing, enabling higher quality image data to be acquired. On the other hand, since RAW movies require image processing to be applied to each frame during playback, the processing load related to the processor is large. Also, RAW movie files are large compared with movie files such as MPEG.

In image processing relating to movies, so-called change amount suppression processing for suppressing change between frames, such as brightness, for example, is generally known. In the case where the scene being shot changes abruptly during movie shooting, display that is unnatural as a movie such as flicker and the like will result, when played back in a state where the change between frames is great. In view of this, in the case where an excessive amount of change occurs between frames, display in which abrupt change is suppressed can be achieved by recalculating and applying the amount of change so as to smooth the change. Many algorithms have been proposed for change amount suppression processing, with one typical technique being a recursive algorithm that involves parameter values of the current frame being recalculated from parameter values of the frame one before and used in the calculation of the next frame. This is called time constant processing.

For example, Japanese Patent Laid-Open No. 2012-129719 discloses generating a development parameter of the current frame (performing time constant processing), based on the development parameter value of a past frame preceding the current frame and an intermediate parameter value that is generated from RAW data of the current frame, when playing back a RAW movie. Also, Japanese Patent Laid-Open No. 2012-129719 discloses saving the development parameter of a paused frame when playback is paused, and generating the development parameter of a playback resumed frame, based on the development parameter of the playback paused frame saved when playback was paused and an intermediate parameter value that is generated from the RAW data of the playback paused frame, when playback is resumed from the paused position.

However, this is premised on resuming playback from the playback paused position and does not support starting playback from an arbitrary position.

The aforementioned time constant processing is premised on processing frames in order starting from the first frame. Accordingly, the computational amount for newly calculating the parameter values of a certain frame will increase according to the number of frames from the first frame to that frame.

Even in the case of playing back from an intermediate position of a file, in order to make the frame appear the same as when played back from the beginning of the file, it is necessary to develop the frame using the same development parameter values as in the case of playing back from the beginning of the file.

Japanese Patent Laid-Open No. 2012-129719 describes a parameter generation method for when resuming playback from where playback was paused but does not consider parameter generation when starting playback from an arbitrary position.

SUMMARY OF THE INVENTION

The present invention has been made in view of the aforementioned problems, and provides a technology that, with regard to parameters associated with change amount suppression processing, enables generation of parameter values equivalent to when frames are processed in order from the first frame, at a predetermined processing amount, when playing back a RAW movie, regardless of the playback starting position.

According to a first aspect of the invention, there is provided an image processing apparatus for performing playback processing of a RAW movie file in which information related to a development parameter is stored in a frame, the apparatus comprising: a processing unit configured to execute parameter determination processing for determining a development parameter to be used in development processing of a target playback frame within the RAW movie file, based on a difference between a development parameter for the target playback frame and a development parameter used in development processing of a proceeding frame; a developing unit configured to perform development processing on a RAW image of the target playback frame in accordance with the development parameter determined by the processing unit, and to output an image obtained in the development processing; and a control unit configured to control the processing unit, wherein the control unit, in a case where a playback start position in the RAW movie file is designated by a user, determines a development parameter for a frame of interest corresponding to the playback start position, by causing the processing unit to execute the parameter determination processing for each of a plurality of frames from a frame that is a preset number of frames before the frame of interest to the frame of interest.

According to a second aspect of the invention, there is provided a method of controlling an image processing apparatus for performing playback processing of a RAW movie file in which information related to a development parameter is stored in a frame, the method comprising:

(a) executing parameter determination processing for determining a development parameter to be used in development processing of a target playback frame within the RAW movie file, based on a difference between a development parameter for the target playback frame and a development parameter used in development processing of a proceeding frame;

(b) performing development processing on a RAW image of the target playback frame in accordance with the development parameter determined in the executing (a), and outputting an image obtained in the development processing; and (c) controlling the executing (a), wherein the control (c), in a case where a playback start position in the RAW movie file is designated by a user, determines a development parameter for a frame of interest corresponding to the playback start position, by causing the executing (a) to execute the parameter determination processing for each of a plurality of frames from a frame that is a preset number of frames before the frame of interest to the frame of interest.

According to a third aspect of the invention, there is provided a non-transitory computer-readable storage medium storing a program which, when read and executed by a computer, causes the computer to executes the steps of a method of controlling an image processing apparatus for performing playback processing of a RAW movie file in which information related to a development parameter is stored in a frame, the method comprising:

(a) executing parameter determination processing for determining a development parameter to be used in development processing of a target playback frame within the RAW movie file, based on a difference between a development parameter for the target playback frame and a development parameter used in development processing of a proceeding frame;

(b) performing development processing on a RAW image of the target playback frame in accordance with the development parameter determined in the executing (a), and outputting an image obtained in the development processing; and (c) controlling the executing (a), wherein the control (c), in a case where a playback start position in the RAW movie file is designated by a user, determines a development parameter for a frame of interest corresponding to the playback start position, by causing the executing (a) to execute the parameter determination processing for each of a plurality of frames from a frame that is a preset number of frames before the frame of interest to the frame of interest.

According to the present invention, when playing back a RAW movie, it becomes possible to perform natural playback without any sense of incongruity, by playing back development parameters smoothly, regardless the playback starting position.

Further features of the present invention will become apparent from the following description of exemplary embodiments (with reference to the attached drawings).

BRIEF DESCRIPTION OF THE DRAWINGS

FIG. 5 is a diagram showing the transition of parameters in time constant processing in the embodiment.

FIG. 6 is a diagram showing the transition of parameters in time constant processing in the embodiment.

FIG. 7 is a diagram showing the transition of parameters in time constant processing in the embodiment.

FIG. 8 is a diagram for describing peripheral darkening.

FIG. 9 is a diagram for describing peripheral light amount correction processing.

FIG. 10 is a diagram showing an example of color temperature in the embodiment.

FIG. 12 is a diagram showing the transition of parameters in time constant processing in the embodiment.

FIG. 13 is a flowchart showing processing for determining the number of iterations of time constant processing in the embodiment.

FIG. 14 is a diagram showing the number of iterations of time constant processing to be performed prior to starting playback for every parameter in the embodiment.

FIG. 15 is a diagram showing the transition of parameters in time constant processing in the embodiment.

FIG. 16 is a diagram showing the transition of parameters in time constant processing in the embodiment.

FIG. 17 is a diagram showing the number of iterations of time constant processing to be performed prior to starting playback, which depends on the largest amount of change of parameters and the coefficients of time constant processing in the embodiment.

DESCRIPTION OF THE EMBODIMENTS

Figure 1:
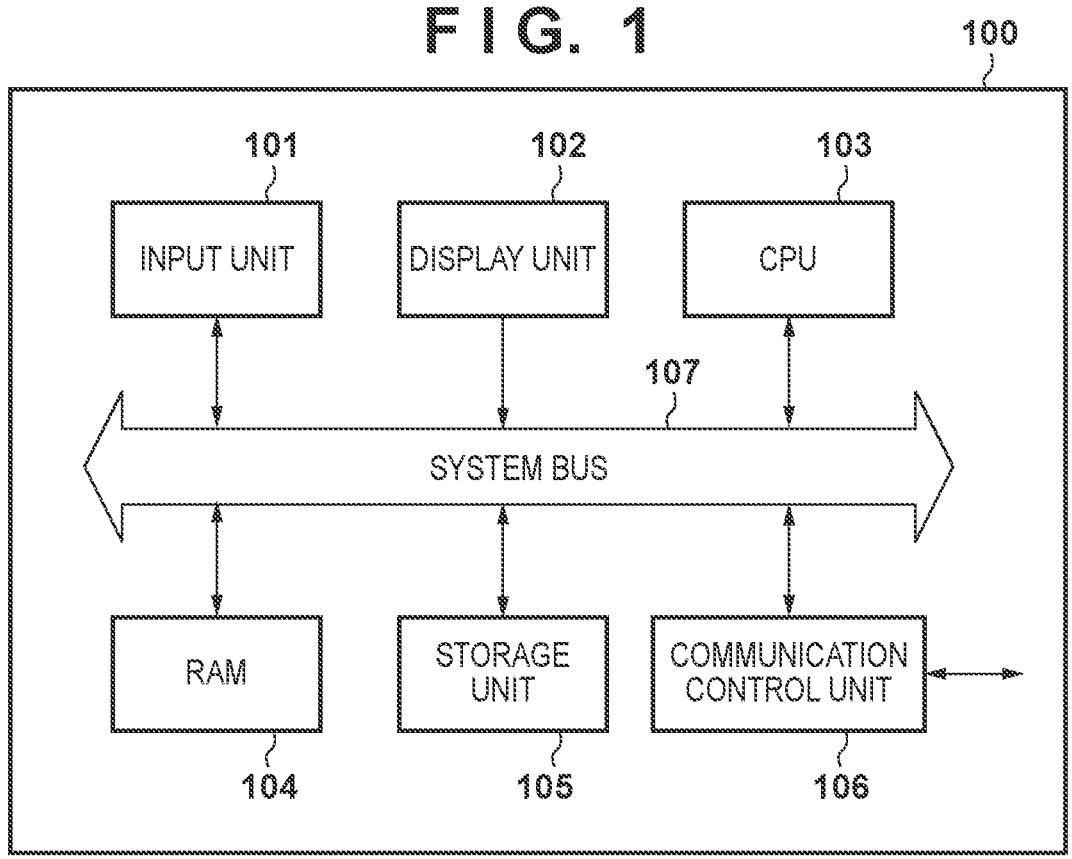
FIG. 1 is a block configuration diagram of a movie processing apparatus in an embodiment.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

Configuration of Movie Processing Apparatus

FIG. 1 is a block configuration diagram of a movie processing apparatus 100 for performing playback processing of RAW movie files to which the embodiments are applied. Hereinafter, the configuration and operations of the movie processing apparatus 100 will be described, with reference to the drawings.

An input unit 101 includes a keyboard, a pointing device and the like, and is used by a user to input instructions for controlling buttons or the like that are displayed on a display unit 102. Note that a mouse, a trackball and a tablet are given as examples of a pointing device.

The display unit 102 is constituted by a display device such as a CRT or an LCD, and is arranged to display GUI (Graphical User Interface) screens and image data. A graphics card having a GPU, a video memory and the like is also included in the display unit 102.

CPU 103 is a control unit that controls the entire movie processing apparatus. RAM 104 provides the CPU 103 with a work area required in various processing by the movie processing apparatus. Also, a RAW movie development processing program (including time constant processing) and a control program such as an operating system (OS) that are stored in a storage unit 105 are executed by the CPU 103 after initially being read out to the RAM 104.

The storage unit 105 stores the OS, the RAW movie development processing program, RAW movie files and the like required in various processing by the movie processing apparatus. Note that the RAW frames constituting a RAW movie file are assumed to be Bayer array images, with one pixel (R, G and B are decided by pixel position) being 10 bits, for example. Normally, in order to perform display on a screen, in the case where one pixel is constituted by three components R, G and B and played back as SDR, each component needs to be 8 bits, and, thus, development processing of RAW images needs to be performed. Also, development parameters for each frame within a RAW movie file are assumed to be stored in the header of the frame.

A communication control unit 106 connects to an external device, using USB (Universal Serial Bus), Ethernet or the like, as a communication interface. Also, a wireless connection mode may be used instead of a wired connection that uses a communication cable. The RAW movie file described previously is also the result of a RAW movie (not shown) being obtained by this communication control unit 106 through communication with an image capturing apparatus.

The above units are connected by a system bus 107.

Although the embodiments illustrate an example in which the RAW movie development processing program is recorded in the storage unit 105, the present invention is applicable, even in the case where the program is on an external storage unit or network connected to the communication control unit 106.

In the above configuration, upon the power source of the present apparatus being switched ON, the CPU 103 executes a boot program of an internal ROM (not shown), reads out the OS from the storage unit 105 to the RAM 104, and executes the OS. Then, due to the CPU 103 reading out the RAW movie development processing program from the storage unit 105 to the RAM 104 and executing the program, the present apparatus will function as the movie processing apparatus 100.

Time Constant Processing

Figure 2:
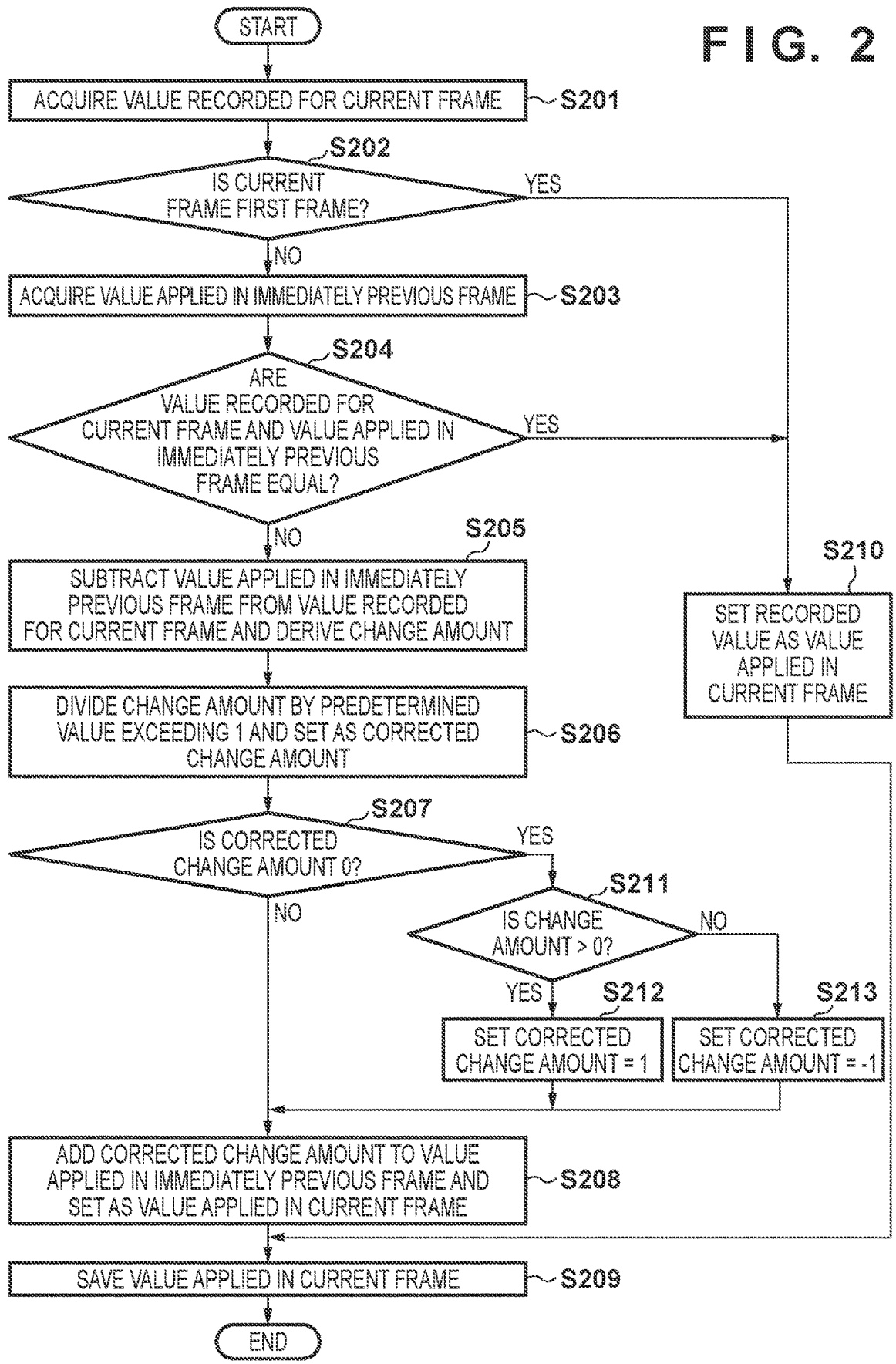
FIG. 2 is a flowchart showing time constant processing in the embodiment.

Time constant processing will be specifically described using the flowchart of FIG. 2. The image capturing apparatus that creates the RAW movie file to be played back in the embodiments is assumed to store various types of parameters used in image capture in the header of the individual frames, when recording a RAW movie. In the embodiments, a parameter that contributes to suppressing a sharp change during scene changes is called a development parameter. Typically, such parameters include "aperture" and "white balance" of an optical system indirectly representing the brightness of an image. In the embodiments, the value of a development parameter is a signed integer. Note that, in the following description, the frame in a RAW movie file that is going to be played back will be referred to as the current frame or the frame of interest.

In step S201, the CPU 103 acquires a development parameter value (defined as "Pn") recorded for the current frame that is going to be played back. Next, in step S202, the CPU 103 determines whether the current frame is the first frame to be played back. The CPU 103 advances the processing to step S210 if it is determined that the current frame is the first frame, and advances the processing to step S203 if it is determined that the current frame is not the first frame.

In step S203, the CPU 103 acquires a parameter value (defined as "P'n−1") applied in developing the preceding (immediately previous) frame saved in step S209 described later. In step S204, the CPU 103 determines whether the value acquired in step S201 and the value acquired in step S203 are equal. The CPU 103 advances the processing to step S210 if it is determined that both values are equal and advances the processing to step S205 if it is determined that both values are not equal.

In step S205, the CPU 103 subtracts the value acquired in step S203 from the value acquired in step S201 and derives a change amount delta.

$$delta=Pn-P'n-1$$

Next, in step S206, the CPU 103 divides the change amount delta derived in step S205 by a predetermined coefficient (k) exceeding 1, and derives a corrected change amount delta'.

$$delta'=delta/k$$

In step S207, the CPU 103 determines whether the corrected change amount delta' derived in step S206 is 0. If the corrected change amount is 0, the CPU 103 advances the processing to step S211. Also, if the corrected change amount delta' is other than 0, the CPU 103 advances the processing to step S208. This is because, although the division result is rounded down to 0 if an absolute value less than 1 in the case of converting the division result to an integer, this still allows the minimum change amount from the immediately previous frame to be applied.

In step S208, the CPU 103 adds the corrected change amount derived in step S206 or in step S212 or S213 described later to the value acquired in step S203, and sets the resultant value as a development parameter P'n to be applied in developing the frame currently being processed.

$$P'n=P'n-1+delta'$$

In step S209, the CPU 103 saves the value derived in step S208 or the value derived in step S210 described later in an area of the RAM 104 secured in advance as the development parameter to be applied in developing the current frame, for the purpose of developing the next frame.

In step S210, the CPU 103 sets the development parameter value Pn recorded for the current frame and acquired in step S201 as the value Pn' to be applied in current frame developing.

$$P'n=Pn$$

In step S211, the CPU 103 determines whether the result derived in step S205 is a positive number. The CPU 103 advances the processing to step S212 if the derived result is a positive number and advances the processing to step S213 if the derived result is a negative number. In step S212, the CPU 103 sets the corrected change amount delta' to 1. This is the minimum change amount when the change from the immediately previous frame increases. In step S213, the CPU 103 sets the corrected change amount delta' to −1. This is the minimum change amount when the change from the immediately previous frame decreases.

Once the development parameter Pn' of the current frame has been determined by the above processing, current processing in accordance with this parameter will be executed, in the development processing of another task by the CPU 103.

Here, an example in which time constant processing is performed 8 times with coefficient k=2, when the recorded development parameter value changes from 0 to 100, will be described with reference to FIG. 3.

n=0 is the first frame, and the recorded development parameter value P0 is directly set as the value P'0 to be applied in frame developing.

Assume that the recorded development parameter value P1 changes to 100 when n=1. At this time, the value P'0 that is applied in frame developing of the immediately previous frame is 0, and the change amount delta which is the difference will be set to 100 as shown in the following equation.

delta=$P1-P'0$=100−0=100

Accordingly, the corrected change amount delta' obtained by dividing the change amount delta by the coefficient k will be 50 as shown in the following equation.

Therefore, the value P'1 obtained by adding delta' to P'0 is set to 50 by the following equation.

$P'1=P'0$+delta'=0+50=50

Accordingly, the parameter value that is applied in development processing of the frame of interest in the case of n=1 is 50.

Similarly, when n=2, delta=$P2-P'1$=100−50=50 delta'=delta/$k$=50/2=25

$P'2=P'1$+delta'=50+25=75

Accordingly, the parameter value that is actually applied in frame developing is 75.

Figures 3, 4:
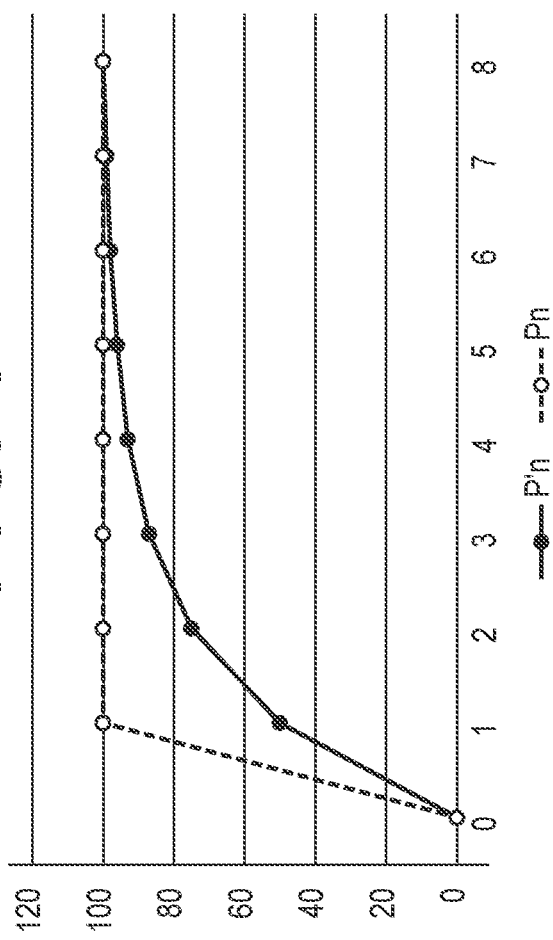
FIG. 3 is a diagram showing the transition of parameters in time constant processing in the embodiment.
FIG. 4 is a graph showing the transition of parameters in time constant processing in the embodiment.

When the time constant processing is repeatedly performed in this way, the parameter value that is actually applied in frame developing will be 100 in the 8th iteration, and reaches the recorded development parameter value, as shown in FIG. 3.

FIG. 4 represents Pn and P'n in FIG. 3 with a graph. The broken line is the development parameter value Pn recorded in the RAW movie file, and the solid line is the parameter value P'n that is applied in frame developing.

As also evident from this graph, by repeating the time constant processing using an appropriate coefficient k, abrupt changes in value are suppressed, and the development parameter is able to reach the final target parameter value in a time-constant manner.

FIG. 5 is an example in which the parameter value changes within a range of 0 to 100, and time constant processing is performed with coefficient k=2. As shown in FIG. 5, a development parameter value P12 recorded in the RAW movie file is 70 when n=12, whereas the parameter value P'12 that is applied in frame developing as a result of performing time constant processing from n=0 is 72.

FIG. 6 is an example in which time constant processing is started from n=4, in the case where the recorded parameter value is the same as FIG. 5. At this time, the parameter value P'12 that is applied in frame developing when n=12 after 8 frames is 72, and the same value as the case where time constant processing is performed from the first frame in FIG. 5 can be obtained. This is because, when time constant processing is repeatedly performed 8 times with coefficient k=2, convergence (=reaching the change amount) is possible even in the case of change amount 100, as seen in FIG. 3.

FIG. 7 is an example in which time constant processing is started from n=10, in the case where the recorded parameter value is the same as FIG. 5. In this case, the parameter value P'12 that applied in frame developing when n=12 is 80, and the same value as the case where time constant processing is performed from the first frame in FIG. 5 cannot be obtained.

Example 1 of Applying Time Constant Processing

Peripheral light amount correction will be described, as an example of applying time constant processing.

As shown in FIG. 8, a phenomenon in which the light amount of a peripheral portion of the image data decreases compared to a middle portion. This is generally referred to as peripheral darkening. Vignetting due to the lens barrel or diaphragm on light that enters obliquely is given as an example of a cause of peripheral darkening.

Also, the degree of peripheral darkening changes according to the aperture value. For example, if the aperture value is large (diaphragm is stopped down), there is less likelihood of being affected by the lens barrel, and the degree of peripheral darkening is low. Conversely, as the aperture value decreases (diaphragm is opened up), there is a greater likelihood of being affected by the lens barrel, and the degree of peripheral darkening increases.

For example, in FIG. 8, a shooting condition 1 represented with a dotted line is a case where the aperture value is large, and a shooting condition 2 represented with a solid line is a case where the aperture value is small.

There is a correction method that involves applying image processing for increasing the light amount of the peripheral portion to peripherally darkened image data and correcting the image data. This is referred to as the peripheral light amount correction. Specifically, the method involves correcting peripheral darkening, by applying a predetermined correction gain value that depends on lens characteristics and aperture value, according to the image height from the center of the image.

For example, since the degree of peripheral darkening is small in the case where the aperture value is large, a small correction gain value is applied, and since the degree of peripheral darkening is large in the case where the aperture value is small, a large correction gain value is applied.

In FIG. 9, similarly to FIG. 8, the shooting condition 1 represented with a dotted line is the case where the aperture value is large, and the shooting condition 2 represented with a solid line is the case where the aperture value is small. Since the drop in light amount is small in the case where the aperture value is large, the correction gain is small, and since the drop in light amount increases in the case where the aperture value is small, the correction gain also increases.

In this way, the correction gain value that is applied in the peripheral light amount correction changes depending on the aperture value. Thus, in the case where the aperture value changes abruptly, the correction gain value corresponding to the aperture value will also change abruptly. For example, in the example in FIG. 9, in the case where there is a change from the shooting condition 1 to the shooting condition 2 during shooting, the correction gain of the furthest point from the center will change from 50 to 100. The images after peripheral light amount correction at this time are appropriate in the case where display is performed as frame-by-frame still images, but could possibly not be appropriate in the case of display performed continuously as a movie, due to large changes in appearance.

In view of this, by applying time constant processing, it becomes possible to apply peripheral light amount correction while suppressing abrupt changes in appearance, by gradually changing the correction gain value that is applied, even in the case where the aperture value changes abruptly.

Example 2 of Applying Time Constant Processing

White balance will be described as a different example of applying time constant processing.

White balance is processing for determining whiteness and color tone, according to the color temperature of the light source.

As shown in FIG. 10, cloudy sunlight (color temperature around 7000 K (Kelvin)) has a bluish tinge, whereas the light of a fluorescent light (4000-4500 K) has a yellowish tinge. Thus, even when a white object is shot, the image will be affected by the color of the light source, and thus will not be captured as a white image.

White balance is processing for determining whiteness by adding an opposite color to the color of these light sources, in order to reduce the influence of the color of the light sources. For example, in the case of shooting under cloudy sunlight, blue is suppressed by enhancing the red element, and in the case of shooting under the light of a fluorescent light, the yellowish coloring is suppressed by enhancing the blue element.

Auto white balance involves inferring the color temperature of the light source from image data, and performing white balance processing, based on the inferred color temperature.

In the case of moving during shooting from indoors where the light source is a fluorescent light to outdoors where the light source is sunlight, the color temperature of the light source changes, and the white balance processing also changes as a result.

Even in such cases, it becomes possible to apply the appropriate white balance while suppressing abrupt changes in appearance, by gradually changing the color temperature of the light source serving as the basis for white balance.

First Embodiment

Figure 11:
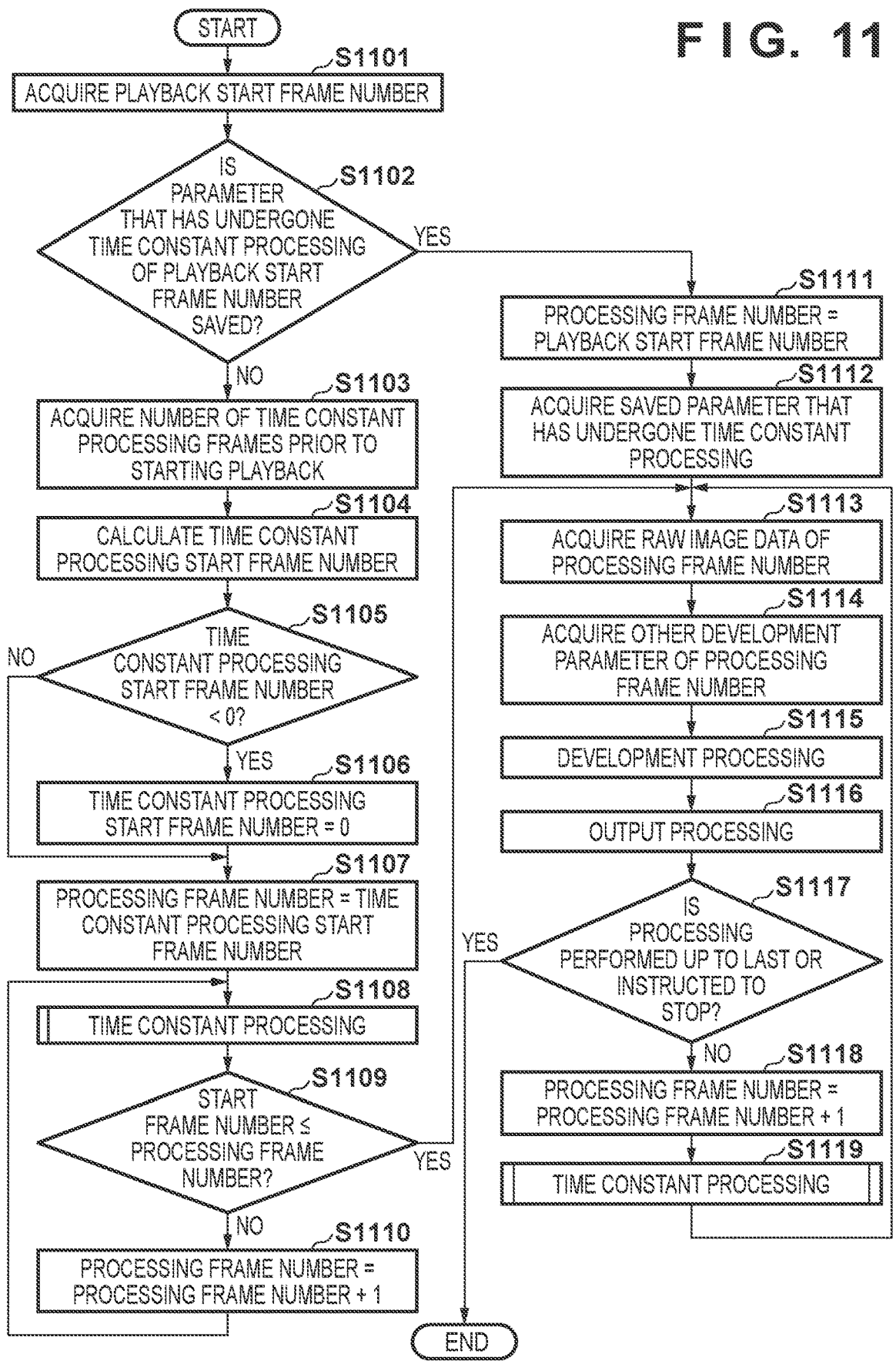
FIG. 11 is a flowchart showing playback processing of a RAW movie in the embodiment.

The processing in a first embodiment will be described with reference to the flowchart of FIG. 11. Here, the target development parameter is the correction gain value of peripheral light amount correction. This correction gain value is dependent on the aperture value of the image capturing optical system as described previously.

In step S1101, the CPU 103 acquires a playback start frame number designated by the user from the input unit 101. The method of designating the playback start frame is not particularly specified. If the user designates a position that is 5 seconds after the beginning as a playback start position in the case where the framerate of the RAW movie is F frames per second (in the case where the framerate is F/sec), for example, the frame number of playback start can be specified if calculated as 5×F. Depending on the case, the user may input a frame number from a keyboard in text format. Also, the playback start frame number may be designated by positioning a slider control representing the playback position. Also, the playback start frame number can be designated, by giving a playback start instruction from the last playback stop position.

In step S1102, the CPU 103 investigates, in relation to the parameter of the playback start frame number designated step S1101, whether a parameter value that has already undergone time constant processing is saved in a predetermined area of the RAM 104. For example, in the case where the user instructs resumption of playback from the last playback stop position, the time constant processed value used during the last playback of the playback start frame will have been saved. The CPU 103 advances the processing to step S1111 if it is determined that such a parameter value has been saved and advances the processing to step S1103 if it is determined that such a parameter value has not been saved.

In step S1103, the CPU 103 acquires the number of frames on which time constant processing has been performed prior to starting playback.

As described in FIGS. 3 to 7, when the coefficient k to be used in time constant processing has been determined, the number of repetitions of the time constant processing performed until reaching a certain amount of change is determined. For example, in the case where the range of correction gain values that the peripheral light amount correction can take is from 0 to 100, the largest amount of change (the amount of change from the smallest to the largest) is 100. Here, when the coefficient k of time constant processing is set to 2, the result of the time constant processing will reach the largest amount of change of 100, if time constant processing is repeatedly performed 8 times. Accordingly, by setting the coefficient k of time constant processing to 2 and the number of frames for performing time constant processing before starting playback to 8, in relation to the correction gain value of peripheral light amount correction, the same result as the case where time constant processing is performed from frames prior thereto can be obtained.

In this way, the number of iterations of time constant processing for the largest change amount to converge need only be derived in advance from the largest change amount of the development parameter value that is targeted for time constant processing and the value of coefficient k to be used, and the derived value need only be set as the number of frames on which to perform time constant processing to be performed prior to starting playback. This value need only be saved as part of a program or as management data.

In step S1104, the CPU 103 calculates the frame number to serve as the starting point for starting time constant processing. The frame number for starting time constant processing is a value obtained by subtracting the number of frames on which to perform time constant processing before starting playback acquired in step S1103 from the playback start frame number acquired in step S1101.

In step S1105, the CPU 103 determines whether the result calculated in step S1104 is a negative number. The CPU 103 advances the processing to step S1106 if it is determined that the calculation result of step S1104 is a negative number and advances the processing to step S1107 if it is determined that the calculation result is a non-negative number. In step S1106, the CPU 103 sets the time constant processing start frame number to 0. This means that the first frame of a RAW movie file will be the time constant processing start frame, due to the negative frame number being invalid. In step S1107, the CPU 103 sets the time constant processing start frame number derived in step S1104 or step S1106 as the processing frame number.

In step S1108, the CPU 103 executes time constant processing, in relation to the parameter of the processing frame number. The time constant processing has been described with FIG. 2. The result calculated here is not used in development processing, in the case where the processing frame number has not reached the playback start frame number and is only used as an input of the time constant processing of the next frame number. In step S1109, the CPU 103 determines whether the processing frame number has reached the playback start frame number acquired step S1101. The CPU 103 advances the processing to step S1113 if it is determined that the playback start frame number has been reached and advances the processing to step S1110 if it is determined that the playback start frame number has not been reached. In step S1110, the CPU 103 adds 1 to the processing frame number and returns the processing to step S1108.

On the other hand, in step S1102, the CPU 103 advances the processing to step S1111, if a parameter value that has already undergone time constant processing is saved, in relation to the parameter of the designated playback start frame number. In this step S1111, the CPU 103 sets the playback start frame number as the processing frame number. In step S1112, the CPU 103 then acquires the time constant processed parameter value that is saved and sets the acquired parameter value as the parameter value to be used in developing of the processing frame number. At this point in time, the time constant processed parameter value of the playback start frame number has been acquired.

In step S1113, the CPU 103 acquires the RAW image data of the processing frame number. In step S1114, the CPU 103 then acquires a development parameter of the processing frame number that has not undergone time constant processing. In the present example, this parameter is a development parameter other than the correction gain value of peripheral light amount correction. In step S1115, the CPU 103 executes development processing using the time constant processed development parameter and the development parameter that has not undergone time constant processing acquired step S1114, in relation to the RAW image data acquired in step S1113. The time constant processed development parameter here is one of the value of the result calculated in step S1108, the value of the result calculated in step S1119, and the value acquired in step S1112.

In step S1116, the CPU 103 outputs image data resulting from the developing in step S1115. For example, the image data is displayed on the display unit 102.

In step S1117, the CPU 103 determines whether processing has been performed up to the last frame or the user has designated to stop processing. The CPU 103 ends this processing, if processing has been performed up to the last frame or the user has designated to stop processing. If this is not the case, the CPU 103 advances the processing to step S1118. In this step S1118, the CPU 103 adds 1 to the processing frame number. In step S1119, the CPU 103 executes time constant processing, in relation to the parameter of the processing frame number and calculates a parameter to be used in developing of the processing frame number. The time constant processing has been described with FIG. 2. After executing the time constant processing, the CPU 103 returns the processing to step S1113.

In this way, by executing time constant processing for a predetermined number of frames in relation to frames prior to the starting playback frame number in steps S1108 to S1110, it is possible to obtain the same result as the case where time constant processing is executed from the first frame, in relation to the development parameter value that is applied to the playback start frame.

There may be a plurality of parameters on which time constant processing is performed in relation to the parameters of the development processing. In that case, due to the largest change amount of the individual development parameters and the value of the coefficient k of time constant processing differing, the values of the number of iterations of time constant processing before playback start of the individual development parameters may differ. For example, it is conceivable to perform time constant processing for every correction gain of the peripheral light amount correction and every color temperature of the light source that serves a basis for white balance processing.

As aforementioned, in the case where the range of correction gain values of peripheral light amount correction that can be taken is from 100 to 200, and the coefficient k of time constant processing is 2, the result of the time constant processing reaches the largest change amount of 100, by repeatedly performing the time constant processing 8 times. Thus, in relation to the correction gain value of peripheral light amount correction, the number of iterations of time constant processing to be performed prior to starting playback is 8.

On the other hand, as shown in FIG. 12, in the case where the color temperature of the light source changes from 1000 to 12000, the result of the time constant processing reaches 12000 by repeatedly performing the time constant processing 15 times, when the coefficient k of time constant processing is set to 2. Thus, in relation to the color temperature of the light source, the number of iterations of time constant processing to be performed prior to starting playback is 15.

In such cases, the parameter values to be applied in developing the playback start frame can be derived by deriving the number of iterations of time constant processing to be performed prior to starting playback for every individual type of development parameter, and respectively performing time constant processing from the processing start frame, but is not efficient.

A method of determining the number of iterations of time constant processing to be performed prior to starting playback in the case of performing time constant processing in relation to a plurality of development parameters will be described, using the flowchart of FIG. 13.

Here, the development parameters for performing time constant processing are the two parameters "correction gain value of peripheral light amount correction" and "color temperature of light source", as shown in FIG. 14, and the number of iterations of time constant processing to be performed prior to starting playback is respectively 8 and 15.

In step S1301, the CPU 103 initializes a variable i that is used as a parameter index to 0. In step S1302, the CPU 103 initializes a variable Lmax for storing the maximum repetitions that is derived to 0.

In step S1303, the CPU 103 determines whether processing has been performed in relation to all the development parameters for performing time constant processing. The CPU 103 ends this processing if it is determined that processing has been performed in relation to all the development parameters for performing time constant processing. The maximum repetitions Lmax in the case of ending this processing turns will be the number of iterations of time constant processing to be performed prior to starting playback.

In step S1304, the number of iterations of time constant processing to be performed prior to starting playback is acquired, in relation to an ith development parameter for performing time constant processing. This is the number of repetitions of time constant processing determined from the largest change amount of the development parameter and the value of the coefficient k that is used in time constant processing relating to the development parameter, as described in step S1103 of FIG. 11. In this example, as shown in FIG. 14, in the case of the correction gain value of peripheral light amount correction of a parameter index 0, the number of repetitions of time constant processing is 8, and, in the case of the color temperature of the light source of a parameter index 1, the number of repetitions of time constant processing is 15.

In step S1305, the CPU 103 determines whether the number of repetitions of time constant processing acquired in step S1304 is greater than the maximum repetitions Lmax. The CPU 103 advances the processing to step S1306 if it is determined that the number of repetitions of time constant processing acquired in step S1304 is greater than Lmax, and advances the processing to step S1307 if it is determined that the acquired number of repetitions is not greater than Lmax.

In step S1306, the CPU 103 substitutes (sets) the number of repetitions of time constant processing acquired in step S1304 for the maximum repetitions Lmax. In other words, the CPU 103 updates the maximum repetitions Lmax.

In step S1307, the CPU 103 adds 1 to the variable i that is used as the parameter index and returns the processing to step S1303.

It thus becomes possible to derive required values with a simple configuration, by determining the time constant processing start frame prior to starting playback, performing time constant processing in relation to all the development parameters for performing time constant processing from that frame, and deriving the parameter values to be applied in developing the playback start frame.

In this example, the number of iterations of time constant processing to be performed prior to starting playback is 15 since 8<15, and thus time constant processing will be performed, in relation to both the correction gain value of peripheral light amount correction and the color temperature of the light source, from 15 frames prior to the playback start frame.

The range of values that the development parameters can take can also change depending on the image capturing apparatus and shooting conditions. For example, assume that the largest change amount was 200 with a certain lens, in relation to the correction gain value of peripheral light amount correction. In this case, nine repetitions of time constant processing are required to reach the largest change amount when the coefficient is 2, as shown in FIG. 15. Also, assume that the largest change amount was 300 with another lens. In this case, ten repetitions of time constant processing are required to reach the largest change amount when the coefficient is 2, as shown in FIG. 16.

In this way, in the case where the largest change amount of a parameter itself changes, as shown in FIG. 17, the number of repetitions of time constant processing required to reach the largest change amount need only be investigated and tabulated for every coefficient value of time constant processing and largest change amount of the parameter, and this number of repetitions need only be held by a program or held as management data. Note that the image capturing apparatus is assumed to be an apparatus that stores information specifying the lens in use (lens name, etc.) in the header of the RAW movie file, when recording a RAW movie. Then, when acquiring the number of iterations of time constant processing to be performed prior to starting playback, the largest change amount need only be determined from the lens name in the file header, and the number of repetitions of time constant processing required to reach the largest change amount need only be acquired from the aforementioned table, for example.

Although embodiments have been described in detail above, the invention is not limited to these specific embodiments, and various modes in a range that does not depart from the spirit of the invention are also embraced therein. Two or more of the aforementioned embodiments may be combined as appropriate.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-003067, filed Jan. 10, 2020 which is hereby incorporated by reference herein in its entirety.

What is claimed is:

1. An image processing apparatus for performing playback processing of a RAW movie file in which information related to a development parameter is stored in a frame, the apparatus comprising:

a processor; and a memory storing instructions which, when read and executed by the processor, cause the processor to function as:

a processing unit configured to execute parameter determination processing for determining a development parameter to be used in development processing of a target playback frame within the RAW movie file, based on a difference between a development parameter for the target playback frame and a development parameter used in development processing of a proceeding frame;

a developing unit configured to perform development processing on a RAW image of the target playback frame in accordance with the development parameter determined by the processing unit, and to output an image obtained in the development processing; and a control unit configured to control the processing unit, wherein the control unit, in a case where a playback start position in the RAW movie file is designated by a user, determines a development parameter for a frame of interest corresponding to the playback start position, by causing the processing unit to execute the parameter determination processing for each of a plurality of frames from a frame that is a preset number of frames before the frame of interest to the frame of interest, wherein the processing unit determines a development parameter P'n to be used when developing a playback target frame, as $P'n = P'n-1 + \text{delta}/k$ where Pn is the development parameter of the playback target frame and is stored in the RAW movie file, P'n−1 is a development parameter used when development processing of an immediately previous frame was performed, delta is a difference "Pn−P'n−1", and k is a coefficient exceeding 1.

2. The apparatus according to claim 1, wherein the control unit, in a case where a frame within the preset number of frames from a first frame of the RAW movie file is designated as the playback start position, determines the development parameter for the frame of interest, by causing the processing unit to execute the parameter determination processing from the first frame to the frame of interest corresponding to the playback start position.

3. The apparatus according to claim 1, wherein the control unit, in a case where the first frame of the RAW movie file is designated as the playback start position, determines, as the development parameter for the frame of interest, a development parameter for a frame of interest corresponding to the playback start position within the RAW movie file.

4. The apparatus according to claim 1, wherein the control unit includes a determining unit configured to determine, in a case where a playback start position within the RAW movie file is designated by the user, whether the playback start position was designated as a position for resuming playback,
wherein the control unit, in a case where the determination unit determines that the playback start position designated by the user is a position for resuming playback, determines the development parameter of the frame of interest from a development parameter used in development processing of an immediately previous frame and a development parameter of the frame of interest stored in the RAW movie file.

5. The apparatus according to claim 1, wherein the control unit, in a case where a frame that is a preset number of frames before the frame of interest does not exist, causes the processing unit to execute processing with the first frame in the RAW movie file as a starting point.

6. The apparatus according to claim 1, wherein the preset number of frames is determined depending on a type of development parameter.

7. The apparatus according to claim 1, wherein the preset number of frames is a number of iterations of processing that the processing unit needs to execute to reach a largest value that a development parameter can take in a case of changing from a smallest value to the largest value.

8. The apparatus according to claim 1,
wherein, in a case where there are a plurality of types of development parameters, a largest number, among the number of iterations of processing that the processing unit needs to execute to reach a largest value that each development parameter can take in a case of changing from a smallest value to the largest value is set as the preset number of frames.

9. A method of controlling an image processing apparatus for performing playback processing of a RAW movie file in which information related to a development parameter is stored in a frame, the method comprising:
(a) executing parameter determination processing for determining a development parameter to be used in development processing of a target playback frame within the RAW movie file, based on a difference between a development parameter for the target playback frame and a development parameter used in development processing of a proceeding frame;
(b) performing development processing on a RAW image of the target playback frame in accordance with the development parameter determined in the executing (a), and outputting an image obtained in the development processing; and
(c) controlling the executing (a),
wherein the control (c), in a case where a playback start position in the RAW movie file is designated by a user, determines a development parameter for a frame of interest corresponding to the playback start position, by causing the executing (a) to execute the parameter determination processing for each of a plurality of frames from a frame that is a preset number of frames before the frame of interest to the frame of interest,
wherein, in the executing (a), a development parameter P'n to be used when developing a playback target frame is determined, as $$P'n = P'n-1 + \text{delta}/k$$

where Pn is the development parameter of the playback target frame and is stored in the RAW movie file, P'n−1 is a development parameter used when development processing of an immediately previous frame was performed, delta is a difference "Pn−P'n−1", and k is a coefficient exceeding 1.

10. A non-transitory computer-readable storage medium storing a program which, when read and executed by a computer, causes the computer to executes the steps of a method of controlling an image processing apparatus for performing playback processing of a RAW movie file in which information related to a development parameter is stored in a frame, the method comprising:
(a) executing parameter determination processing for determining a development parameter to be used in development processing of a target playback frame within the RAW movie file, based on a difference between a development parameter for the target playback frame and a development parameter used in development processing of a proceeding frame;
(b) performing development processing on a RAW image of the target playback frame in accordance with the development parameter determined in the executing (a), and outputting an image obtained in the development processing; and
(c) controlling the executing (a),
wherein the control (c), in a case where a playback start position in the RAW movie file is designated by a user, determines a development parameter for a frame of interest corresponding to the playback start position, by causing the executing (a) to execute the parameter determination processing for each of a plurality of frames from a frame that is a preset number of frames before the frame of interest to the frame of interest,
wherein, in the executing (a), a development parameter P'n to be used when developing a playback target frame is determined, as $$P'n = P'n-1 + \text{delta}/k$$

where Pn is the development parameter of the playback target frame and is stored in the RAW movie file, P'n−1 is a development parameter used when development processing of an immediately previous frame was performed, delta is a difference "Pn−P'n−1", and k is a coefficient exceeding 1.

* * * * *